Claude Dillon
INVENTOR.

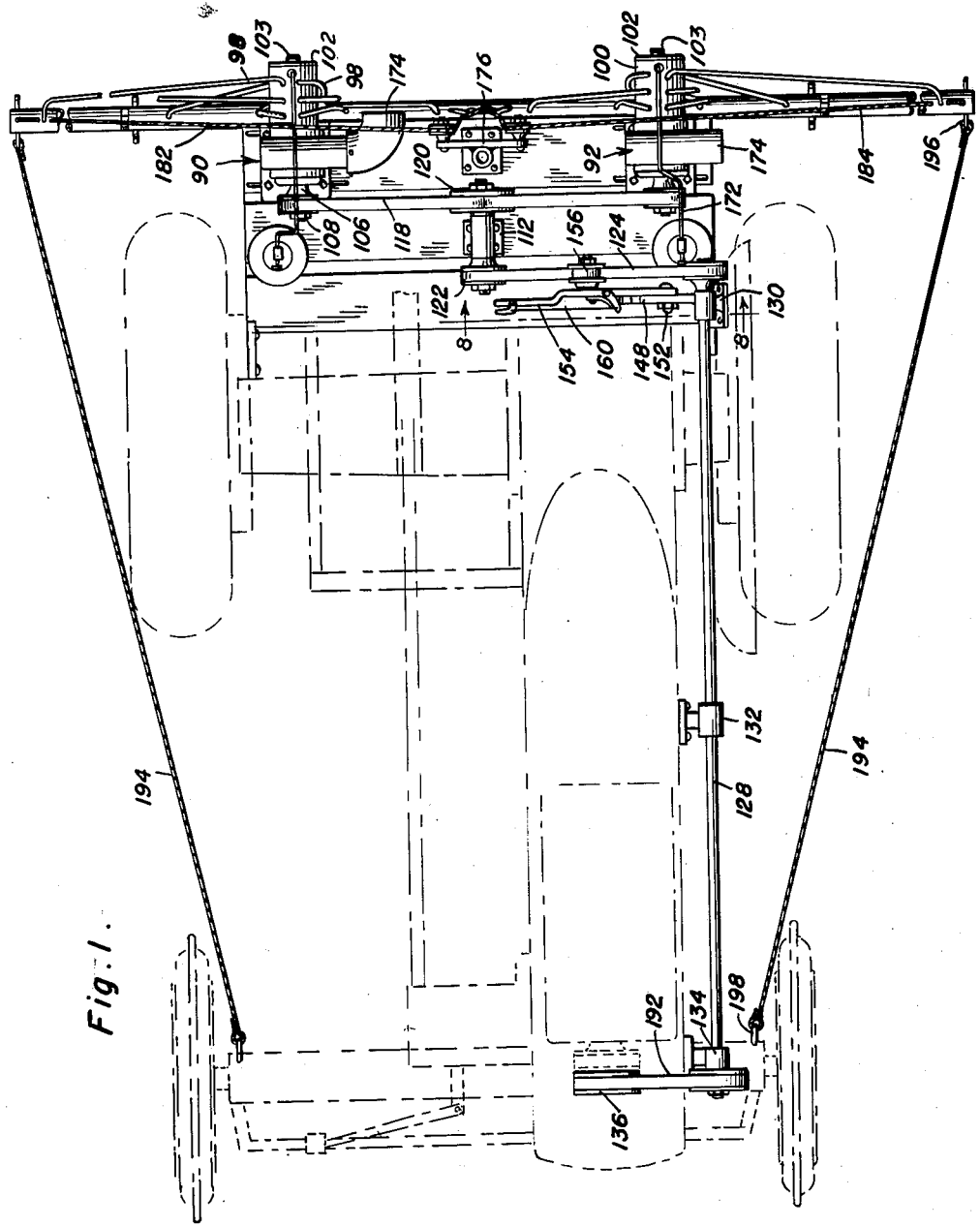

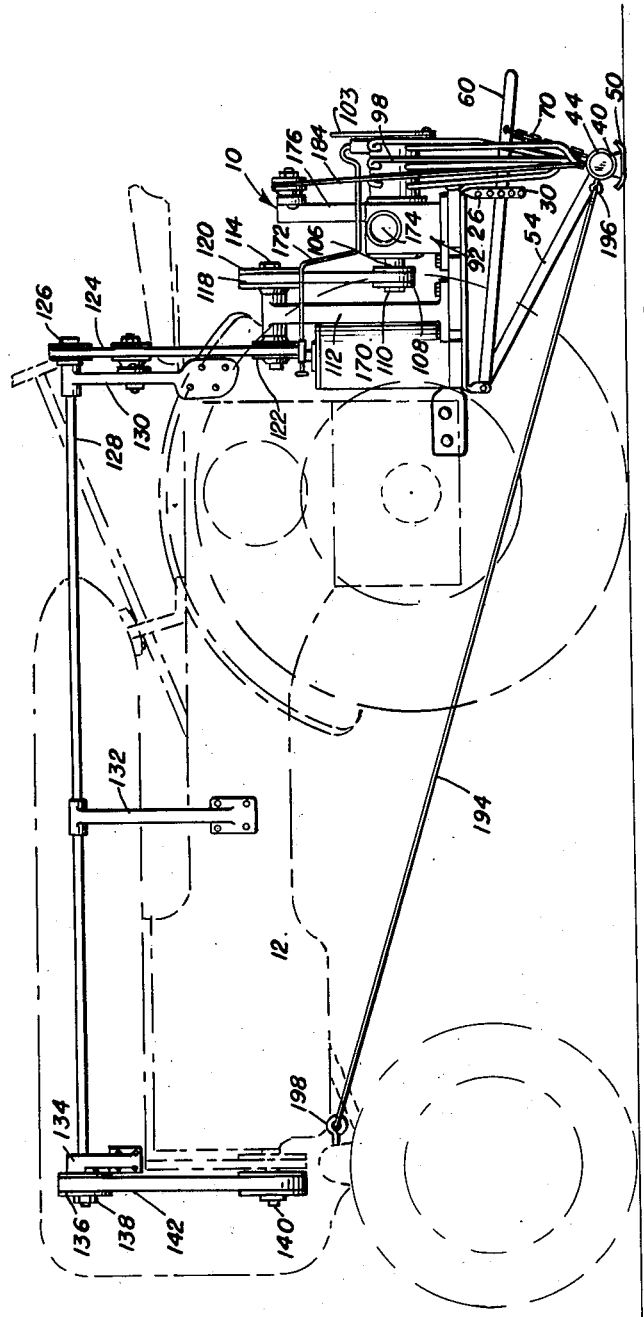
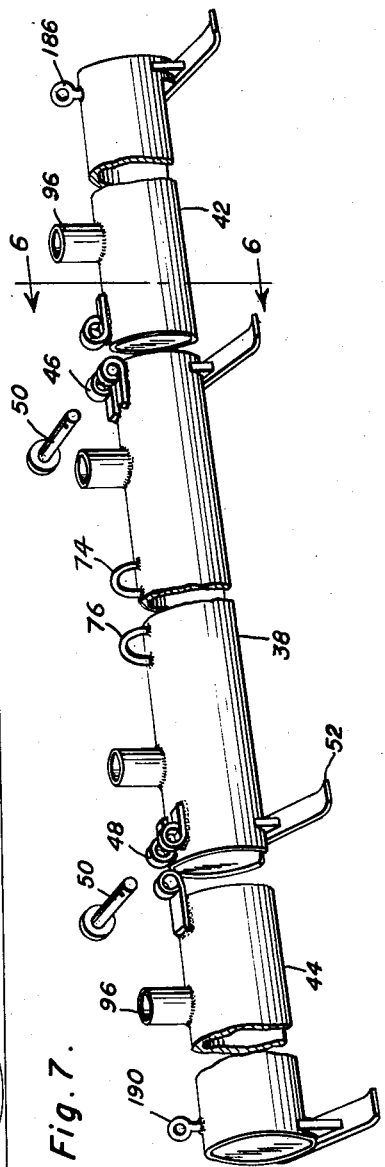

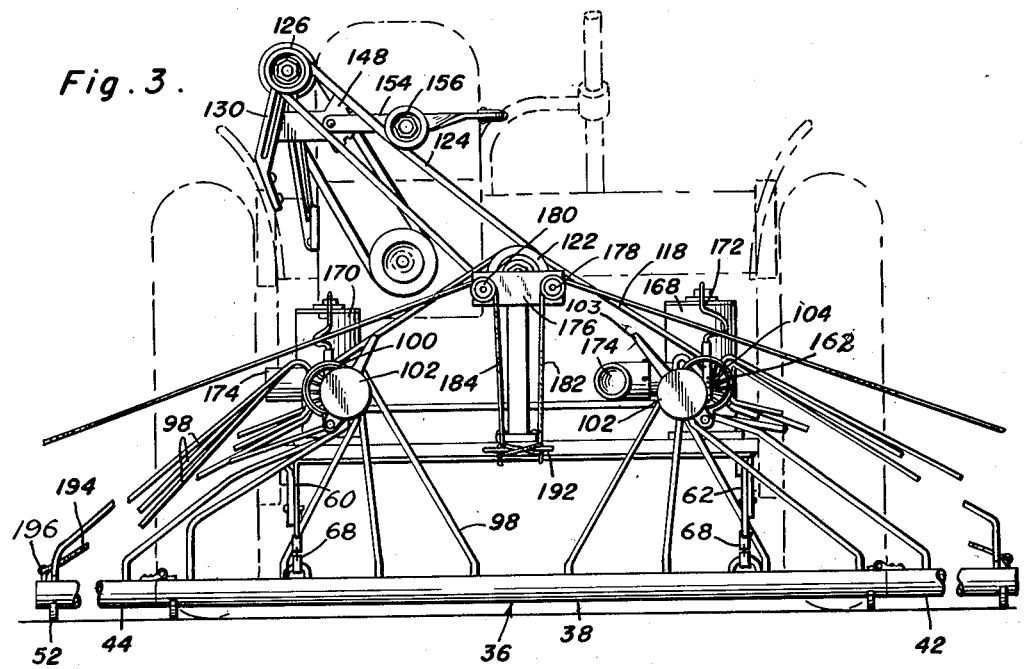
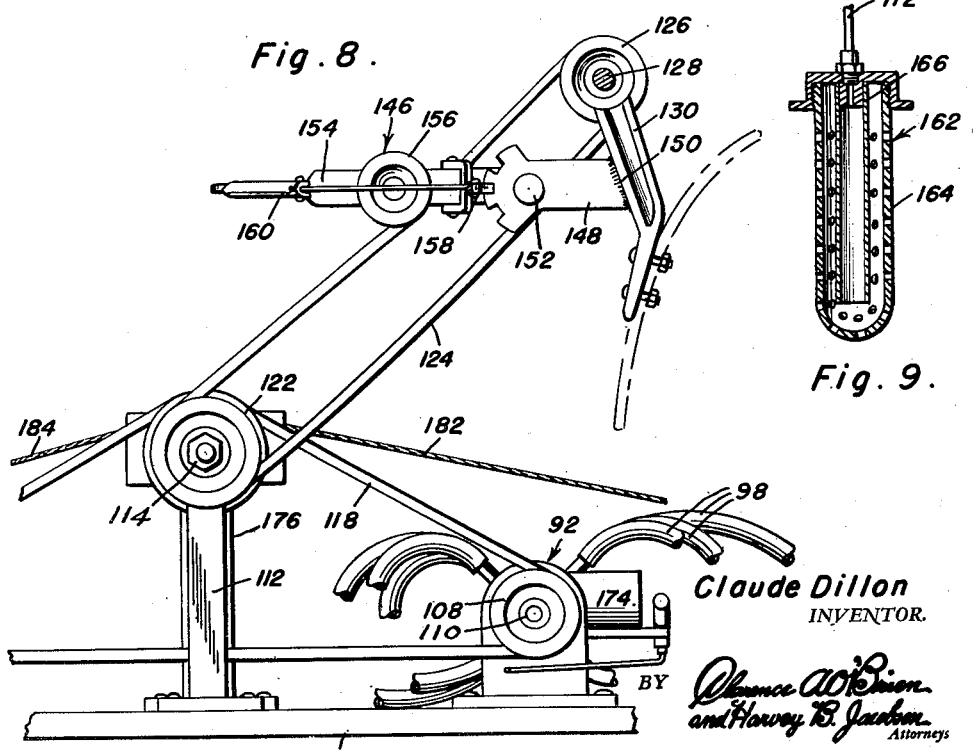

Patented Aug. 26, 1952

2,608,023

UNITED STATES PATENT OFFICE 2,608,023

SUCTION DEVICE WITH BURNER MEANS FOR EXTERMINATING INSECTS

Claude Dillon, Dexter, N. Mex.

Application May 7, 1948, Serial No. 25,685

4 Claims. (Cl. 43—140)

1

This invention relates to an insect exterminating device and has for its primary object to remove insects from row and sown plants and crops, without damage to the plants or crops.

Another important object of this invention is to exterminate the insects which are removed from the plants and to discard the insects back on the ground.

Another object of this invention is to provide an insect removing and exterminating device which is easily attached to a conventional farm powered unit and drafted thereby over the ground in contact with the crops.

Another object of this invention is to provide an insect exterminating attachment for a conventional tractor, which is operated or powered off the crankshaft of the tractor and which is adjustable to assume various heights in relation to the crops and plants.

A meritorious feature of this invention resides in the provision of means for withdrawing or removing insects from crops and for exterminating the insects and conveying them back onto the ground, all of the foregoing operations being successively produced, responsive to movement of the tractor or powered unit over the ground.

Yet another important feature of this invention resides in the provision of a transverse pick-up tube which is adapted to overlie the crops and plants, the same being adjustable and which is communicated with burner units, mounted on the tractor, so that insects drawn up through the tube are conveyed to the burner unit and exterminated.

Still another important feature of this invention resides in the provision of an attachment for a tractor, adaptable for use as a support for blower units, the blower units being powered off the crankshaft of the tractor and adapted to remove bugs or insects from the crops by suction and to convey them to burner units, where the bugs are exterminated.

A further important feature of this invention resides in the provision of blower outlets for the burner units whereby the bugs or insects may be blown directly on the ground, and thus the need for a container or the like is obviated and eliminated.

These and ancillary objects and other meritorious features are attained by this invention, a preferred embodiment of which is set forth in the following description and illustrated in the accompanying drawings, wherein:

Figure 1 is a top plan view of a conventional farm tractor, showing this invention operatively associated and attached therewith;

2

Figure 2 is a side elevational view of this invention, showing the same in attachment with a tractor;

Figure 3 is a rear elevational view;

Figure 7 is a perspective view of the inlet tube;

Figure 8 is an enlarged fragmentary elevational view of the means provided for powering the burner units and is taken on the line 8—8 of Figure 1, looking in the direction of the arrows; and Figure 9 is a sectional view of one of the burner units.

This invention refers particularly to a drafted attachment for a conventional farm powered unit and serves to remove insects from plants and crops in such a positive manner that damage to the plants from the insects or from the attachment is obviated. It is a fundamental purpose of this invention to enable the entire operation of removing, exterminating, and disposing of the insects and bugs to be successively performed by one machine or attachment, responsive to movement of a powered unit over the ground. Accordingly, this invention aims to provide a device for performing, upon movement of the tractor, the successive operations of creating a suction and removing bugs from the plants by means of the suction, conveying the bugs to heated blower units and advancing the bugs onto the ground, after extermination. In order to enable the attachment to be employed to full use and advantage, it has been proposed to adjustably mount the unitary assembly and various components thereof, adjustable relative to the powered unit and adjustable relative to other components. While the majority of similar attachments and units are operated from the power take-off shaft or unit of a tractor, it has been deemed more feasible to provide a novel operating assembly for this invention, in order to maintain a constant and steady operation. Thus, the same is powered off the crankshaft, so that the process of starting and shifting gears does not affect the operation of the blower burners.

Referring now more particularly to the drawings, wherein similar characters of reference designate corresponding parts throughout, this invention, generally designated by the character reference 10, is shown in operative association with a conventional farm powered unit, such as a tractor 12. The tractor serves to power and draft the insect exterminating attachment and the various adjustments of the attachment and the operation thereof may be readily and easily controlled by the operator of the tractor from his ordinary and normal seated position on the tractor seat.

Figure 4:
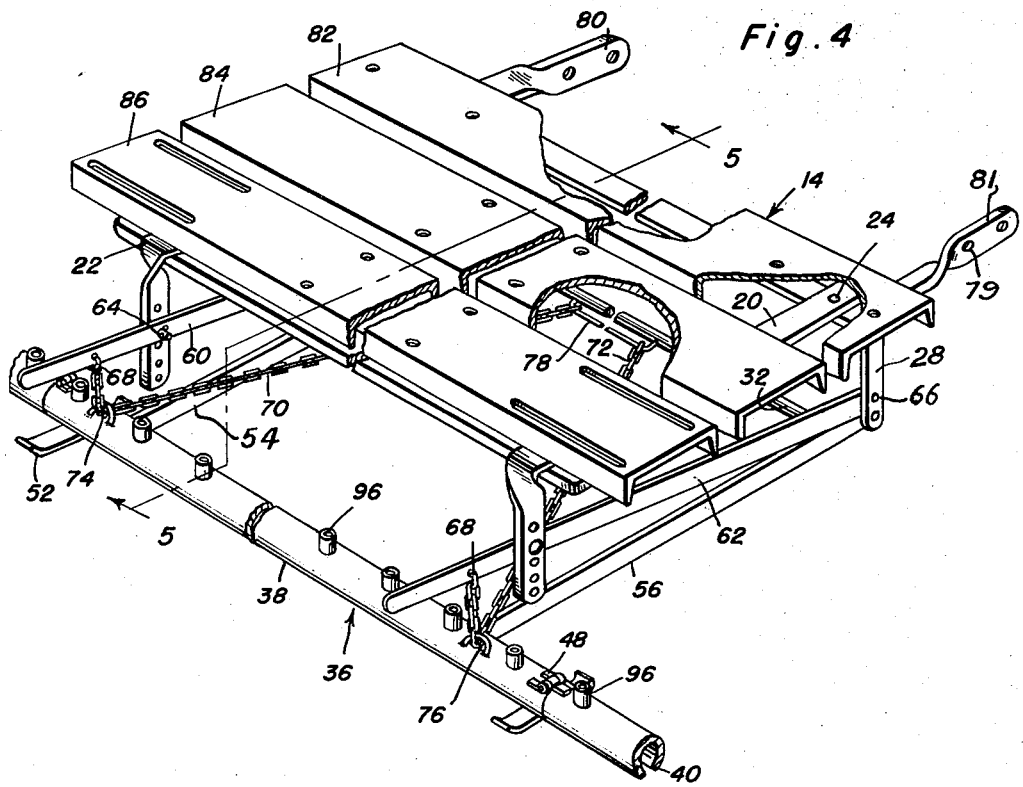
Figure 4 is a view in perspective of the attaching platform, adapted to be easily and quickly attached to a conventional tractor and utilized to support a plurality of blower burner units.
Figure 5:
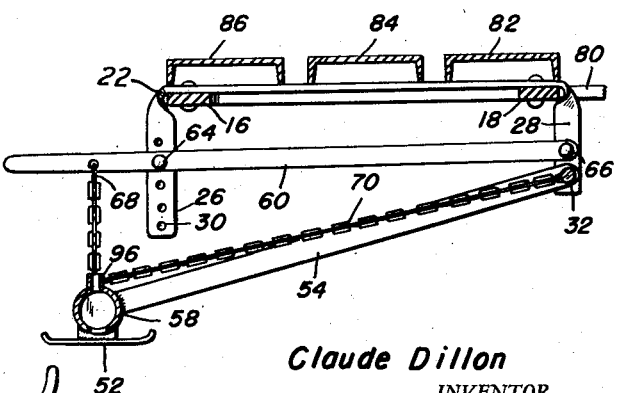
Figure 5 is a vertical sectional view taken substantially on the plane of line 5—5 in Figure 4.

In carrying out this invention, there is provided a supporting frame 14, with reference to Figures 4 and 5 of the drawings. The supporting frame 14 comprises a pair of parallel bars 16 and 18. A pair of connecting band bars 20 and 22 are secured to the opposite ends of the parallel bars 16 and 18 by suitable securing means, such as rivets or bolts 24. The bars 20 and 22 have their ends bent downwardly in lateral fashion defining hanger straps 26 and 28. The strap bar 26 extends beyond the bar 28 and has a series of vertically spaced adjusting apertures 30 provided therein. A rod 32 extends between the opposed strap end 28 of the bars 20 and 22 and is secured at each end within suitable apertures formed in the terminating portions of the strap ends. An intake assembly 36 is adjustably mounted on the strap ends 26 and 28 of the bars.

Figure 6:
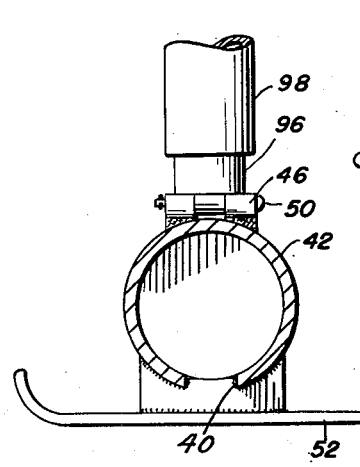
Figure 6 is a cross sectional view taken on line 6—6 of Figure 7.

The intake assembly comprises a suction conduit 38, as shown more particularly in Figures 4, 6 and 7. The suction conduit or tube 36 is adapted to extend transversely of the powered unit or tractor 12 and to be adjustably supported by the depending hanger strap ends of the bars 20 and 22. A longitudinal opening 40 is formed in the lower portion of the tube or conduit and is adapted to overlie the ground. Similar tubes 42 and 44 are adjustably secured to the extending ends of the main tube or conduit 38 by means of hinge sections 46 and 48 cooperatively carried by the main section 38 and the auxiliary sections 42 and 44. Connecting bolts 50 are provided to secure the auxiliary sections to the main section, as shown more particularly in Figure 7. Of course, runners or the like 52 are bracketed to the under side of the main conduit and auxiliary sections for spacing the same in ground contact and for enabling the suction conduit to be easily moved over the ground in close suction engagement with the plant.

Opposed support arms 54 and 56 extend from the hanger support 28, upon which they are pivotally supported and are welded, as at 58, to the forward portion of the main conduit or tube 38.

Means is provided for positively and conveniently adjusting the vertical placement of the main suction conduit 38 and comprises a pair of opposed operating levers 60 and 62 which are pivoted, as at 66, to the depending hanger bars 28 of the bars 20 and 22. The operating levers 62 and 60 extend rearwardly of the support platform 14 and are adapted to be secured by a bolt assembly 64 or the like securing means to the desired or selected attaching aperture 30 in the opposed hanger supports 26, as shown in Figure 4. Attaching rings 68 are suitably secured, adjacent the extending ends of the operating levers, and support adjusting means 70 and 72, such as chains, cables, or the like. The adjusting chains 70 and 72 are guided through rings 74 and 76 secured on the uppermost portion of the main conduit 38 and spaced transversely thereon. An anchor rod 78 is secured to the transverse rod 32 and the opposite ends of the chains 70 and 72 are secured thereon.

Thus, to raise and lower the main suction conduit 38 and the auxiliary hinged end sections, as a unit, the securing means 64 is removed from the operating levers and the levers are moved up and down, causing the chains 72 and 70 to raise and lower the intake unit 36, as shown in the drawings, and more particularly in Figure 4.

Projecting forwardly from the parallel frame bar 18 are parallel attaching bars 80 and 81, having attaching apertures 79 formed therein. The attaching bars 80 and 81 are adapted to be secured to the rear hubs of a tractor or to any desired rear portion thereof by bolt assembly, thus rendering the same easily attached and detached to the tractor.

Mounted on the bars 20 and 22 in transverse fashion are channel bars 82, 84, and 86, the same serving as a base or support for the blower burner units. The blower burner units 90 and 92 are adjustably mounted on the channel bar 86 by means of bolts adjustably received in slots formed in the channel bar, and are powered off the crankshaft of the tractor to produce a suction in the suction conduit and thereby remove or pick the insects from the plants. In this respect, vertical attaching tubes 96 are formed integrally with the suction tubes 38, 42 and 44 and are adapted to receive a plurality of communicating tubes 98. The tubes 98 are attached to the blower burner units 90 and 92. The blower burner units 90 and 92 comprise a cylindrical housing 100, having a closed end and an open extending end. The open end is adjustably closed by a handled damper 102, pivotally secured to an edge portion of the open end for pivoting and sliding movement over that end, so that the intake of air into the blower burner unit is controlled selectively, as seen best in Figure 3. The damper is provided with a handle 103. Rotatably mounted within the cylindrical casing 100 are a series of unitary blades 104, which define the blowers. The blades are mounted radially on an extending shaft 106, which extends or projects forwardly beyond the casing, as seen in Figure 2 of the drawings. A pulley 108 is keyed on the extending ends of the shafts and retained thereon by a locking nut 110. A bearing standard 112 is centrally mounted on the support bar 84 and rotatably retains a driving shaft 114. Thus, the driving shaft 114 is centrally disposed between the blower burner units 90 and 92 and is adapted to simultaneously drive the blowers 104 comprising the units. Thus, suitable means is provided for connecting the driving shaft 114 with the similarly formed and opposed driven shaft 106 of the units 90 and 92. The means preferred comprises a belt 118 which is received around a pulley 120 secured on the rearwardly projecting end of the driving shaft 114 and communicated with the pulley 108 of the shaft 106. The driving shaft 114 has a pulley 122 secured on the opposite ends thereof and is communicated by a connecting belt 124 with a pulley 126 received on the extending end of a longitudinal driving shaft 128. The longitudinal shaft 128 is bracketed to the side of the tractor by means of bearing brackets 130, 132 secured to the side adjacent the rear and medial portions respectively. The shaft 128 is rotatably mounted in the bearing brackets and its forward end is supported by a similar bracket 134. A pulley 136 is secured on the forward end of the shaft 128 by a locking nut 138. The pulley 136 communicates with the crankshaft 140 of the tractor through the medium of a connecting belt 142.

Thus, it can be seen that rotation imparted to the longitudinal shaft 128 through the medium of the crankshaft 140 is transmitted to the driving shaft 114 through the medium of the communicating belt 124. Accordingly, the blowers 104 mounted in the casing, adjacent the sides of the tractor and extending rearwardly therefrom on the platform 14, are operatively associated with the crankshaft and powered therefrom.

Suitable means is provided to enable the driver or operator of the tractor to control the working operations of the blowers. The means preferred comprises a clutch assembly 146. The clutch assembly 146 comprises an extending ratchet 148, which is welded, as at 150, to the bearing bracket or arm 130. An operating lever 154 is pivoted as at 152 to the ratchet bracket. A pulley 156 is rotatably supported by the lever 154 in potential engagement with the belt 124. A pawl 158 is pivoted to the lever and adapted to selectively engage the ratchet. Operating linkage 160 is adapted to effect the desired engagement of the pawl with the ratchet. Thus, it can be seen that a certain amount of slack is provided in the belt 124, and, accordingly, until the pulley 156 is moved into tightening engagement with the belt, the same is inoperative. When the belt is inoperative, rotation from the longitudinal shaft 128 is denied the operating or driving shaft 114. However, movement of the lever 154 produces a tightening effect on the belt 124, caused by the engagement of the belt with the tightening pulley 156 and, accordingly, power is transmitted to the driving shaft 114 and to the blowers 104.

Means is preferably provided for exterminating the bugs or insects drawn up through the tubes or hoses 98 into the cylindrical casings 100 by the blowers 104 and comprises a pair of burner units 162 mounted within the casing adjacent to the blowers 104. The burners 162 comprise an apertured shell 164, within which is concentrically disposed a burner tube 166. The burner tube 166 communicates with a fuel reservoir 168 and 170 disposed on the channel bars 82, behind the casings 100. The communicating means preferably includes a flexible hose 172 or the like feasible medium. In this regard, it can be seen that the insects drawn into the casing by the blowers are burned or exterminated through the heat given off from the shell 164 and permeating through the apertures disposed in the walls thereof.

Outlet tubes or conduits 174 are offset from and communicated with the blowers 104 and are adapted to convey the exterminated bugs or insects and project them back onto the ground.

At times, it may be found desirable to provide means for raising and lowering the auxiliary suction tubes 42 and 44, which are hingedly attached to the main section 38. This may be found desirable and necessary in order to enable the attachment 12 to be moved through a driveway or pasture entrance, or the like entrance and exit. In this respect, a T-shaped bracket 176 is mounted on the channel bar 86 and extends vertically therefrom. Sheaves 178 and 180 are rotatably fixed on the crossed portion of the bracket. Adjusting cables or ropes, or the like, 182 and 184 are guided in the sheaves and extend to eyelets or hooks 186 and 190 formed adjacent the ends of the auxiliary units and extending vertically therefrom. An anchor 192 projects from the platform 14 and serves to retain the free ends of the cables as seen in Figure 3. To rigidify the auxiliary sections in their operative and lowered placement, cables or rods, as preferred, 194, are connected between extending hooks 196 on the auxiliary sections and support hooks 198 on the front axle housing of the tractor.

In view of the foregoing description, in the light of the accompanying drawings, it is believed that the novelty and usefulness of this invention may be apparent, since it can be appreciated that there is provided a device which will remove, exterminate and cast out insects, the operation being responsive to the movement of the tractor or powered unit over the ground.

However, since many other purposes and objects of this invention will become apparent to those skilled in the art, upon a perusal of the description and drawings, it is to be understood that certain changes may be effected thereon, as coming within the spirit of the invention and the scope of the appended claims.

Having described the invention, what is claimed as new is:

1. An insect exterminating apparatus comprising a wheel mounted support, a platform secured to and projecting from one end of the support, a blower unit provided with a suction inlet mounted on said platform, a burner disposed in said suction inlet, a fuel reservoir mounted on the platform and connected to the burner, a conduit transversely carried by the platform and adapted to be positioned adjacent the ground, said conduit having a longitudinal slot in its under side, flexible tubes connected between the upper portions of the conduit and said suction inlet, means for adjusting said conduit in a vertical plane, and conduit means connected to the exhaust side of the blower unit for conveying insects picked up by the conduit and conveyed to the blower unit and disintegrated back to the ground.

2. An insect exterminating apparatus comprising a vehicle including a support and a power take-off shaft, a platform secured to and projecting from one end of the support, a blower housing mounted on the platform, an impeller rotatably journalled in said housing and driven by the power take-off shaft, a conduit extension on said housing in advance of the impeller, a burner in said extension, a fuel reservoir mounted on the platform and connected to the burner, and a conduit supported by the platform and adjustably suspended transversely therefrom, said conduit having a longitudinal slot in its under side and flexible tubes connected between the conduit and the conduit extension.

3. An insect exterminating apparatus comprising a vehicle including a support and a power take-off shaft, a platform secured to and projecting from one end of the support, a blower housing mounted on the platform, an impeller rotatably journalled in said housing and driven by the power take-off shaft, a conduit extension on said housing in advance of the impeller, a burner in said extension, a fuel reservoir mounted on the platform and connected to the burner, a conduit supported by the platform and adjustably suspended transversely therefrom, said conduit having a longitudinal slot in its under side and flexible tubes connected between the conduit and the conduit extension, and a second conduit extension laterally extending from the housing at the exhaust side of the impeller for conveying insects disintegrated by the burner to the ground.

4. In an insect exterminating apparatus, a support, a combined blower and burner unit mounted on the support, brackets extending downwardly from the support, a pair of support bars pivotally secured to said brackets, a conduit having a longitudinal opening secured transversely to the ends of the support bars, adjusting bars pivotally affixed at one of their ends to said brackets, and flexible members secured to the platform and adjusting bars, and said members being slidably attached to said conduit.

CLAUDE DILLON.

REFERENCES CITED

The following references are of record in the file of this patent:

UNITED STATES PATENTS

| Number | Name | Date |
|---|---|---|
| 533,577 | Ainger | Feb. 5, 1895 |
| 986,193 | Meek | Mar. 7, 1911 |
| 1,146,687 | Britton | July 13, 1915 |
| 1,189,720 | Morrow | July 4, 1916 |
| 1,263,312 | Diserens | Apr. 16, 1918 |
| 1,426,234 | Weiss | Aug. 15, 1922 |
| 1,454,151 | Brown | May 8, 1923 |
| 1,462,861 | Jordan | July 24, 1923 |
| 1,569,196 | McDaniel | Jan. 12, 1926 |
| 1,886,369 | Bogart | Nov. 8, 1932 |
| 2,037,998 | Norquist | Apr. 21, 1936 |
| 2,167,923 | Leffler | Aug. 1, 1939 |
| 2,201,463 | Williams | May 21, 1940 |
| 2,396,533 | Root | Mar. 12, 1946 |
| 2,467,594 | Nichols | Apr. 19, 1949 |